United States Patent Office 2,842,595
Patented July 8, 1958

2,842,595

α-AMINO-4,6-DI-SECONDARY-BUTYL-o-CRESOLS

Raymond H. Rigterink, Midland, Mich., assignor to The Dow Chemical Company, Midland, Mich., a corporation of Delaware No Drawing. Application April 23, 1956
Serial No. 579,755

6 Claims. (Cl. 260—570.9)

This invention relates to N-substituted α-amino-4, 6-di-secondary-butyl-o-cresols having the structure

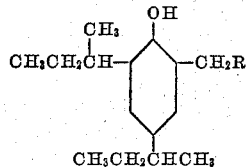

In this and succeeding formulae, R represents a member of the group consisting of dialkylamino wherein alkyl is a lower aliphatic radical containing from 1 to 5 carbon atoms, inclusive, diallylamino, dibenzylamino, dicyclohexylamino and piperidino.

The compounds of the present invention are generally amber or yellow-colored liquids or low melting solids soluble in many organic solvents such as benzene, acetone and ethanol, and substantially insoluble in water. These compounds are active against fungal and bacterial organisms and are adapted to be employed as microbicides.

The new N-substituted-α-amino-4,6-di-secondary-butyl-o-cresols may be perpared by causing 2,4-di-secondary-butylphenol, formaldehyde and a secondary amine having the formula, RH, to interact. The reaction takes place smoothly in the temperature range of from 20° to 120° C. If desired, a solvent such as ethanol may be employed as reaction medium. Good results are obtained when substantially equimolar proportions of 2,4-di-secondary-butylphenol, formaldehyde and an appropriate amine are employed.

In a preferred method of carrying out the reaction, aqueous formaldehyde is added portionwise with stirring and cooling to a mixture of 2,4-di-secondary-butylphenol and the appropriate amine. The resulting mixture, which comprises an organic and an aqueous phase, is stirred to provide good contact therebetween and heated at the reflux temperature for from 1 to 3 hours. At the end of the heating period, the mixture is cooled, the aqueous phase separated from the organic phase and the latter heated at reduced pressure to distill water and low boiling material and to obtain an α-amino-4,6-di-secondary-butyl-o-cresol product as residue. If desired, a fractional distillation may be conducted to obtain a purified product as distillate.

The following examples illustrate the invention but are not to be construed as limiting.

*Example 1.—4,6-di-secondary-butyl-α-dimethylamino-o-cresol*

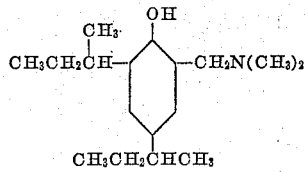

48.7 grams (0.6 mole) of 36–38 percent aqueous formaldehyde was added dropwise with stirring to a mixture of 103 grams (0.5 mole) of 2,4-di-secondary-butylphenol and 270 grams (1.5 mole) of 25 percent aqueous dimethylamine. An evolution of heat accompanied the addition and the resulting heterogeneous mixture was cooled during the addition to maintain the temperature in the range of from 25° to 30° C. After completion of the addition, the mixture was stirred at room temperature for 1.5 hours and then for 3 hours at reflux temperature. At the end of this period, the reaction mixture was cooled and 100 grams of sodium chloride added thereto to facilitate the separation of the aqueous and organic phases. The aqueous phase was removed from the organic phase by means of a separatory funnel, and the organic phase then washed and fractionally distilled to obtain a 4,6-di-secondary-butyl-α-dimethylamino-o-cresol product, boiling from 120° to 130° C. at 0.5 millimeter pressure. The latter had a refractive index $n_D^{24}$ of 1.5057, and a specific gravity at 24° C. of 0.935. The nitrogen content of the product was 5.18 percent, the theoretical being 5.32 percent.

*Example 2.—α-Dibenzylamino-4,6-di-secondary-butyl-o-cresol*

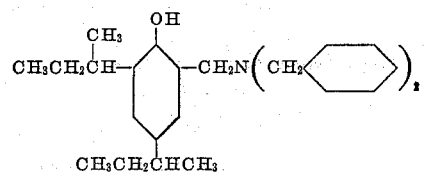

49.4 grams (0.25 mole) of dibenzylamine was added with stirring and cooling to 51.5 grams (0.25 mole) of 2,4-di-secondary-butylphenol. 20.3 grams (0.25 mole) of 36–38 percent aqueous formaldehyde was added portionwise to the above mixture with stirring and cooling to maintain the temperature below 30° C. The resulting heterogeneous mixture was then heated at about 110° C. under reflux for two hours. The mixture on cooling was an emulsion which did not separate into an organic and aqueous phase. The emulsion was heated to 40° C. under reduced pressure to distill low boiling material and to obtain as residue an α-dibenzylamino-4,6-di-secondary-butyl-o-cresol product. The latter was a light amber viscous oil having a refractive index $n_D^{25}$ of 1.5574. The product had a nitrogen content of 3.29 percent, the theoretical being 3.37 percent.

*Example 3.—α-Diallylamino-4,6-di-secondary-butyl-o-cresol*

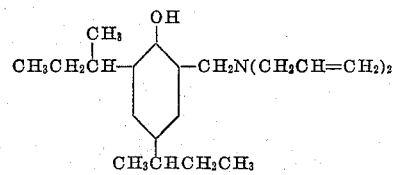

48.6 grams (0.5 mole) of diallylamine was added with stirring and cooling to 103 grams (0.5 mole) of 2,4-di-secondary-butylphenol. 40.6 grams (0.5 mole) of 36–38 percent aqueous formaldehyde was added portionwise to the above mixture with stirring and cooling to maintain the temperature below 30° C. The resulting heterogeneous mixture was then heated at about 97° C. under reflux while stirring for two hours. At the end of this period, the reaction mixture was cooled and the aqueous phase separated from the organic phase by means of a separatory funnel. The organic phase was heated at reduced pressure to 40° C. to distill the low-boiling material and to obtain as residue an α-diallylamino-4,6-di-secondary-butyl-o-cresol product. The latter was an amber-colored viscous oil having a refractive index $n_D^{25}$ of 1.5097.

*Example 4.—4,6-di-secondary-butyl-α-dicyclo-hexylamino-o-cresol*

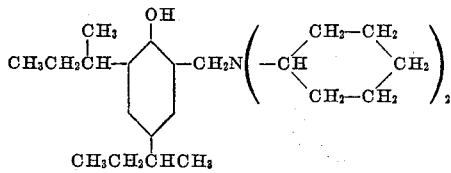

90.7 grams (0.5 mole) of dicyclohexylamine was added with stirring and cooling to 103 grams (0.5 mole) of 2,4-di-secondary-butylphenol. 40.6 grams (0.5 mole) of 36–38 percent aqueous formaldehyde was added thereto portionwise with stirring and cooling to maintain the temperature below 30° C. The resulting heterogeneous mixture was heated at about 102° C. under reflux with stirring for two hours. At the end of this period, the reaction mixture was cooled and the aqueous phase separated from the organic phase. The latter was heated under reduced pressure to a temperature of 40° C. to distill water and low-boiling material and to obtain as residue a 4,6 - di - secondary-butyl-α-dicyclohexylamino-o-cresol product. The latter was a reddish-brown viscous oil having a refractive index $n_D^{25}$ of 1.5108. The product had a nitrogen content of 3.53 percent, the theoretical being 3.51 percent.

*Example 5.—4,6-di-secondary-butyl-α-diisopropylamino - o-cresol*

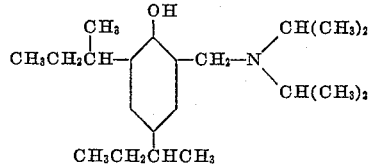

50.6 grams (0.5 mole) of diisopropylamine was added with stirring and cooling to 103 grams (0.5 mole) of 2,4-di-secondary-butylphenol. 40.6 grams (0.5 mole) of 36–38 percent aqueous formaldehyde was added to the above mixture with stirring to provide good contact between the organic phase and the aqueous phase and cooling to maintain the temperature below 30° C. The mixture was then heated at about 100° C. under reflux while stirring for two hours. At the end of this period, the mixture was cooled and the organic phase separated from the aqueous phase by means of a separatory funnel. The organic phase was heated to 40° C. at 5 millimeters pressure to distill the residual water and low-boiling material and to obtain as residue a 4,6-di-secondary-butyl-α-diisopropyl-amino-o-cresol product. The latter was a reddish-brown viscous liquid having a refractive index $n_D^{25}$ of 1.5084.

*Example 6.—4,6-di-secondary-butyl-α-diethylamino-o-cresol*

73.1 grams (1.0 mole) of diethylamine was added portionwise with stirring and cooling to 206 grams (1.0 mole) of 2,4-di-secondary-butylphenol. 81.3 grams (1.0 mole) of 36–38 percent aqueous formaldehyde was added to the above mixture with stirring to provide good contact between the organic phase and the aqueous phase and cooling to maintain the temperature between 20° and 30° C. The mixture was then heated at about 98° C. under reflux while stirring for two hours. At the end of this period, the mixture was cooled to about 60° C., and the organic phase separated from the aqueous phase by means of a separatory funnel. The organic phase was heated at 1 millimeter pressure to 40° C. to distill the residual water and low-boiling material and to obtain as residue a 4,6-di-secondary-butyl-α-diethylamino-o-cresol product. The latter was an amber-colored viscous liquid having a refractive index $n_D^{25}$ of 1.5049.

The following substituted α-amino-4,6-di-secondary-butyl-o-cresols were obtained in preparations carried out in a manner similar to that described in Example 6.

4,6-di-secondary-butyl-α-dipropylamino-o-cresol having a refractive index $n_D^{25}$ of 1.4974 by the reaction of 2,4-di-secondary-butylphenol, formaldehyde and dipropylamine.

4,6-di-secondary-butyl-α-dibutylamino-o-cresol having a refractive index $n_D^{25}$ of 1.4938 by the reaction of 2,4-di-secondary-butylphenol, formaldehyde and dibutylamine.

4,6-di-secondary-butyl-α-dipentylamino-o-cresol having a refractive index $n_D^{25}$ of 1.4917 by the reaction of 2,4-di-secondary-butylphenol, formaldehyde and dipentylamine.

In a similar manner 4,6-di-secondary-butyl-α-piperidino-o-cresol may be prepared from 2,4-di-secondary-butylphenol, formaldehyde and piperidine.

The compounds of the invention are useful as parasiticides and may be employed for the control of bacterial and fungal organisms. In addition, certain of the compounds have utility as insecticides. The utility as a bactericide may be demonstrated in a representative operation wherein a solid nutrient agar medium saturated with 4,6 - di - secondary-butyl-α-dimethylamino-o-cresol gave complete inhibition of growth when streaked with *Staphylococcus aureus* and incubated at 30° C. for three days.

The di-secondary butylphenol employed in this reaction is prepared from butylene and phenol and consists primarily of 2,4-di-secondary butylphenol boiling from 149.0° to 168.0° C. at 25 millimeters pressure and having a specific gravity at 25/25° C. of 0.936–0.940.

I claim:
1. An N-substituted-α-amino-4,6-di-secondary-butyl-o-cresol having the structure

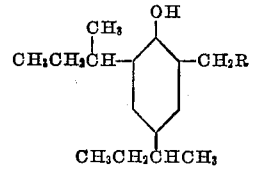

wherein R represents a member of the group consisting of dialkylamino wherein the alkyl is a lower aliphatic radical containing from 1 to 5 carbon atoms, inclusive, diallylamino, dibenzylamino, dicyclohexylamino and piperidino.

2. 4,6-di-secondary-butyl-α-dimethylamino-o-cresol.
3. α-Dibenzylamino-4,6-di-secondary-butyl-o-cresol.
4. 4,6-di-secondary-butyl-α-diethylamino-o-cresol.
5. 4,6-di-secondary-butyl-α-dicyclohexylamino-o-cresol.
6. 4,6-di-secondary-butyl-α-diisopropylamino-o-cresol.

References Cited in the file of this patent

UNITED STATES PATENTS

| | | |
|---|---|---|
| 2,036,916 | Bruson | Apr. 7, 1936 |
| 2,045,517 | Bruson | June 23, 1936 |

OTHER REFERENCES

Adams et al.: "Organic Reactions," vol. I, page 334 (1942).